United States Patent [19]

Fassbinder

[11] Patent Number: 4,756,647
[45] Date of Patent: Jul. 12, 1988

[54] METERING SLIDE FOR FINE-GRAINED SOLIDS

[75] Inventor: Hans-Georg Fassbinder, Am Annaschacht, Fed. Rep. of Germany

[73] Assignee: Kloeckner CRA Technologie GmbH, Fed. Rep. of Germany

[21] Appl. No.: 96,291

[22] Filed: Sep. 8, 1987

Related U.S. Application Data

[63] Continuation of Ser. No. 832,670, Feb. 25, 1986, abandoned.

[30] Foreign Application Priority Data

Mar. 6, 1985 [DE] Fed. Rep. of Germany ....... 3507973

[51] Int. Cl.⁴ ............................................. B65G 53/46
[52] U.S. Cl. ................................... 406/131; 222/561; 222/557; 222/542; 251/208; 251/326; 251/355
[58] Field of Search ....................... 406/128, 130, 131; 137/246, 246.22; 251/208, 326, 355; 222/188, 542, 555, 557, 560, 561

[56] References Cited

U.S. PATENT DOCUMENTS

2,230,600 2/1941 Olson ..................... 137/246 X
3,921,866 11/1975 Palazzo ........................... 222/557 X
4,257,543 3/1981 Muschner et al. .............. 222/561 X
4,501,286 2/1985 Rohlping et al. .......... 137/246.22 X

FOREIGN PATENT DOCUMENTS

691813 10/1930 France ................................ 251/208
541914 4/1956 Italy .................................... 222/561

Primary Examiner—Joseph F. Peters, Jr.
Assistant Examiner—James M. Kannofsky
Attorney, Agent, or Firm—Robert J. Koch

[57] ABSTRACT

A metering slide for fine-grained solids for gastight closing and cross-section-variable opening of vessels and piping in pneumatic conveying systems. A sliding plate provided with a metering opening is moved between two slide rings by a drive in a compression-proof slide casing. The intake side slide ring opening has a predetermined nominal width between 1/10 and ⅓ of the outside diameter of the slide ring. The discharge side slide ring has an inside diameter corresponding to 3 times to 10 times the nominal width of the intake. The slide casing is filled with a lubricant which is under a pressure equal to or higher than the operating pressure of the penumatic conveying system.

13 Claims, 1 Drawing Sheet

METERING SLIDE FOR FINE-GRAINED SOLIDS

This application is a continuation of application Ser. No. 832,670, filed Feb. 25, 1986 now abandoned.

BACKGROUND OF THE INVENTION

1. Field of the Invention

The present invention relates to a metering slide for fine-grained solids for gastight closing and cross-section-variable opening of vessels and piping in pneumatic conveying systems, whereby the sliding plate provided with a metering opening is moved by an appropriate drive means between two slide rings in a compression-proof slide casing.

2. Description of the Prior Art

Numerous fine-grained solids such as cement, metal powder, ceramic powder, artificial fertilizer, dust, e.g. the reflux of gas cleaning plant and flux for making slag for metallurgic methods, are pneumatically conveyed and metered. The fine-grained material is often located in silos from which it is withdrawn in different amounts and at varying flow rates.

Various possibilities of regulating such streams of material are known. It is possible, for example, to use a constant discharge cross-section on the storage vessel and to regulate the volume by means of varying pressure differences between the storage vessel and the space in which the fine-grained material flows. This volume regulation has disadvantages, however, with regard to the pressure differences to be adjusted in practice and the inertia this system involves to a certain degree. Special safety measures are also required when the inside pressure in the vessels increases.

It is also known to use metering valves on the storage bins of the powdery materials to control the amounts discharged, said metering valves working with a variable cross-section. This type of regulation works without any delays to a large extent and does not require any high pressure differences between the intake and discharge vessels. However, the metering openings are subject to higher wear, depending on the hardness of the material to be conveyed. Wear resisting materials such as hard metal and ceramics do not allow, on the other hand, for the discharge opening to be closed in a gastight manner, as proves to be necessary for most applications.

German Pat. No. 23 10 358 relates to an advantageous solution according to which a metering body and a sealing element are disposed, coupled with one another, one after the other in the direction of flow. The seal is effected in this case using known elastic sealing means when the cross-section is wider than the metering body. The disadvantages of this patented apparatus are the more elaborate construction and the larger space required.

SUMMARY OF THE INVENTION

The invention is based on the problem of providing a space-saving apparatus which allows for the streams of fine-grained solids to be controlled with the same or varying flow rates quickly and with great precision, and also ensures at the same time that the storage silos are closed off in a gastight manner from the following charging spaces for the pulverized substances.

The solution to this problem is based on the finding that the sliding plate provided with a metering opening should be moved by a drive means between two slide rings in a compression-proof slide casing and be designed according to the invention in such a way that the preferably circular opening in the slide ring on the intake side has a predetermined nominal width between $1/10$ and $\frac{1}{3}$ of the outside diameter of the slide ring, the slide ring on the discharge side has an inside diameter corresponding to 3 times to 10 times the nominal width of the intake, and the slide casing is filled with a lubricant which is under pressure equal to or greater than the operating pressure in the pneumatic conveying system in which the inventive metering slide is mounted.

The inventive metering slide allows, due to its simple functional structure, for a space-saving construction distinguished by reliability and a long service life.

The inventive apparatus is frequently built with a sliding plate which moves back and forth between the two slide rings. But constructions having a rotating sliding plate have also proved useful. The pivot of the sliding plate is normally located, in this solution, outside the slide rings, and the rotation drive means moves the metering opening eccentrically between the two slide rings.

In the inventive apparatus, both slide rings and the sliding plate are usually made of wear resisting, hard material. The wear resisting materials to be used may be hardened metals, steel, special steel, alloys such as titanium steel, hard metals, sintered ceramics, ceramics such as sintered corundum, mullite, silicon carbide, porcelain and cermets, depending on the expected load, i.e. the hardness of the fine-grained solids to be conveyed. The slide rings and the sliding plate may also be built up of different materials. For example, wear resisting sheaths or hardfacing can be used.

The hermetic seal of the inventive metering slide in a closed state could, surprisingly enough, be obtained reliably with relatively simple means over very long operating periods even in the case of a heavy load. The four sliding surfaces, i.e. the surfaces of the slide rings facing the sliding plate, and the sliding plate itself are provided with surface grinding, and the slide casing is filled according to the invention with a lubricant which is put from outside under pressure which is higher than, or at least equal to, that prevailing in the pneumatic conveying system in which this metering slide is mounted. Commerical oils of varying viscosity and conventional lubricating grease have proved useful as lubricants.

It is intended by the invention that these pressurized lubricants fill in the sealing gap between the sliding plate and the slide rings, thereby sealing it, and furthermore cause the sequence of movements of the sliding plate to be free from wear and smooth. The pressurized lubricants can also ensure the necessary contact pressure of the slide rings on the sliding plate.

The inventive apparatus can be used as an actuator in a flow control circuit. The metering slide is particularly well-suited for this application since the movement of the sliding plate is free from wear and this allows for frequent adjustment movements without any disadvantages for operating reliability.

BRIEF DESCRIPTION OF THE DRAWINGS

With reference to the adjoined drawings, two embodiments of the inventive metering slide shall be described in the following. The drawings show.

DETAILED DESCRIPTION OF THE PREFERRED EMBODIMENT

Figure 1:
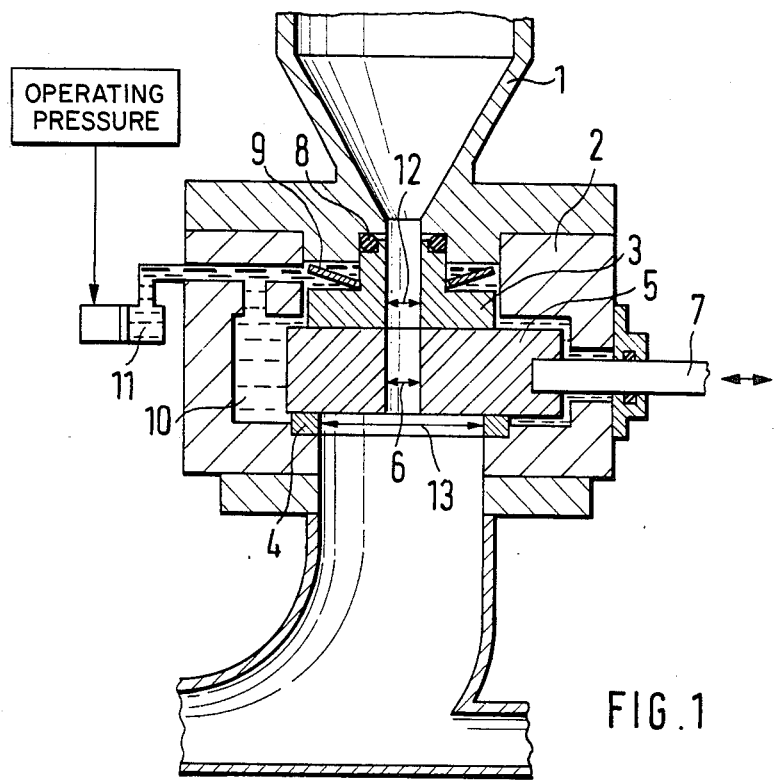
FIG. 1 shows a schematic vertical section of the apparatus having a sliding plate capable of moving back and forth.

According to FIG. 1, the granular solids reach the metering slide through feed hopper 1. The metering slide consists of the compression-proof casing 2 in which slide ring 3 is disposed on the intake side and slide ring 4 on the discharge side. Sliding plate 5 with metering opening 6 and the externally arranged drive means (not shown), which moves sliding plate 5 via connecting rod 7, moves between these two slide rings. Intake slide ring 3 is sealed off by O-ring 8 and biassed by disk spring 9. Oil filling 10, which is kept at the desired operating pressure via pneumatic pressure transformer 11, also acts on slide ring 3, pressing it against sliding plate 5. The sliding surfaces between slide rings 3 and 4 and sliding plate 5 are lubricated and sealed by oil 10. O-ring 8 seals the lubricated portion from the pneumatic or material conveying portion of the apparatus. The position of metering opening 6 in sliding plate 5 with respect to slide ring opening 12 on the intake side results in the unrestricted passage area by which the quantity of fine-grained solids passing through is regulated. FIG. 1 shows the metering slide with the largest cross-section of passage, i.e. the completely opened sliding plate. Inside diameter 13 of slide ring 4 on the discharge side corresponds to four times nominal width 12 of intake slide ring 3.

Figure 2:
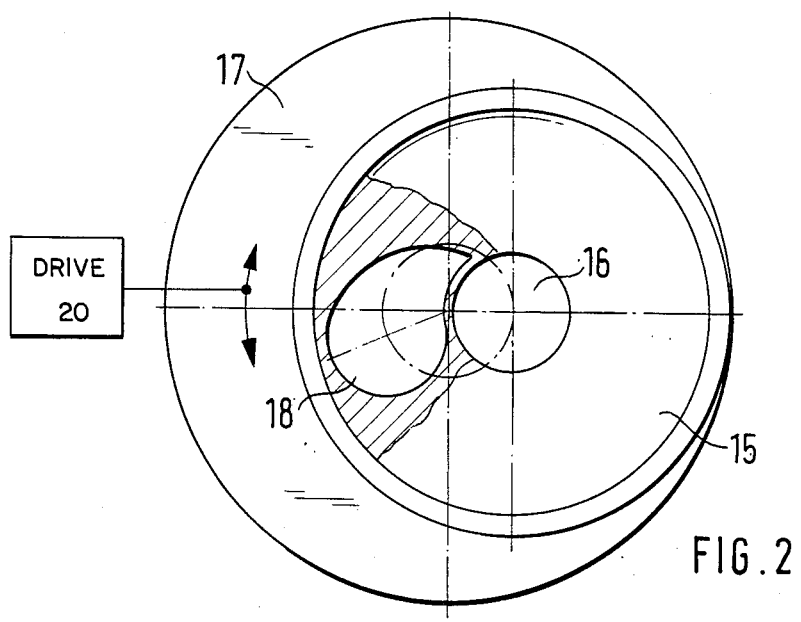
FIG. 2 shows a schematic horizontal section of a different embodiment of the apparatus having an eccentrically rotating sliding plate.

FIG. 2 shows a rotary slide with a rotating sliding plate. Intake slide ring 15 has the circular opening 16 and, when sliding plate 17 is rotated by drive 20, the metering opening 18 in sliding plate 17 releases the cross-section of passage. The special design of metering opening 18 in sliding plate 17 makes it possible to obtain metering characteristics which allow after opening for streams of material which are at first very small by very precisely adjustable.

Due to the special design of the inventive metering slide, for example with regard to the metering characteristics due to the shaping of the metering opening and the appropriate selection of cross-sections, the metering slide can be adapted to the operating conditions. Suitable materials can be selected in relation to the hardness of the powdery materials flowing through.

I claim:

1. A pneumatic conveying system metering slide comprising:
   sliding plate means exhibiting a metering opening for closing and variably opening a conveyance path;
   slide casing means for housing said sliding plate means;
   a first slide ring disposed against an intake side of said sliding plate means, wherein the first slide ring exhibits a circular inner diameter and an outer diameter 3 to 10 times larger than said inner diameter;
   a second slide ring disposed against a discharge side of said sliding plate means, said first and second slide rings are located within said slide casing means and second slide ring has an inner diameter 3 to 10 times larger than a nominal width of said first slide ring inner diameter;
   drive means for moving said sliding plate means between said slide rings; and
   means for lubricating motion of said slide plate means within said slide casing means wherein said means for lubricating is under at least as much pressure as a pneumatic conveying system operating pressure.

2. A metering slide according to claim 1, wherein said sliding plate means is moved back and forth by said drive means.

3. A metering slide according to claim 2, wherein said slide rings and said sliding plate means comprise wear resisting materials.

4. A metering slide according to claim 2, wherein the second slide ring has an inner diameter 4 times larger than a nominal width of said first slide ring inner diameter.

5. A metering slide according to claim 2, further comprising means for automatically adjusting the pressure of the means for lubricating to the operating pressure.

6. A metering slide according to claim 2, wherein said metering opening exhibits a configuration simultaneously suitable for precise adjustment to allow conveyance of very small and large amounts of material.

7. A metering slide according to claim 1, wherein said sliding plate means is mounted eccentrically to said slide rings and is moved rotatingly by said drive means.

8. A metering slide according to claim 7, wherein said slide rings and said sliding plate means comprise wear resisting materials.

9. A metering slide according to claim 7, wherein the second slide ring has an inner diameter 4 times larger than a nominal width of said first slide ring inner diameter.

10. A metering slide according to claim 7, further comprising means for automatically adjusting the pressure of the means for lubricating to the operating pressure.

11. A metering slide according to claim 7, wherein said metering opening exhibits a configuration simultaneously suitable for precise adjustment to allow conveyance of very small and large amounts of material.

12. A metering slide according to claim 1, wherein said metering opening exhibits a configuration simultaneously suitable for precise adjustment to allow conveyance of very small and large amounts of material.

13. A metering slide according to claim 1, further comprising means for automatically adjusting the pressure of the means for lubricating to the operating pressure.

* * * * *